United States Patent
Kim et al.

(10) Patent No.: US 6,554,706 B2
(45) Date of Patent: Apr. 29, 2003

(54) METHODS AND APPARATUS OF DISPLAYING AND EVALUATING MOTION DATA IN A MOTION GAME APPARATUS

(76) Inventors: Gerard Jounghyun Kim, Gyosu Apt. 9-1503, Jigok-dong, Pohang, Kyungbuk (KR); Ungyeon Yang, 40-3, Kayang 2-dong, Donggu, Daejon (KR); Euijae Ahn, Seohae Apt. 202-401, Pungmu-dong, Kimpo, Gyonggi (KR)

( * ) Notice: Subject to any disclaimer, the term of this patent is extended or adjusted under 35 U.S.C. 154(b) by 0 days.

(21) Appl. No.: 09/881,066

(22) Filed: Jun. 15, 2001

(65) Prior Publication Data

US 2002/0019258 A1 Feb. 14, 2002

(51) Int. Cl.$^7$ .......................... A63F 13/00; A63F 9/24; G06F 17/00; G06F 19/00
(52) U.S. Cl. ............................. 463/36; 463/4
(58) Field of Search .................. 463/36, 37, 1, 463/4; 340/825; 341/20; 345/156

(56) References Cited

U.S. PATENT DOCUMENTS

| | | | | |
|---|---|---|---|---|
| 5,602,982 A | * | 2/1997 | Judd et al. .................. 395/326 |
| 5,846,134 A | * | 12/1998 | Latypov ....................... 463/36 |
| 6,183,365 B1 | * | 2/2001 | Tonomura et al. ............ 463/36 |
| 6,322,448 B1 | * | 11/2001 | Kaku et al. ................... 463/32 |
| 2002/0055383 A1 | * | 5/2002 | Onda et al. ................... 463/36 |

* cited by examiner

*Primary Examiner*—Denise L. Esquivel
*Assistant Examiner*—Mark Norman
(74) *Attorney, Agent, or Firm*—Hyung Sohn; Wilmer, Cutler & Pickering (57) ABSTRACT

Methods of displaying and evaluating of a motion data in a motion game apparatus are disclosed. According to the present invention, the motion of a game player following the motion of a dancer can be tracked and evaluated in real time. To induce the correct motion out of the player, in addition to simply showing the animated dancing (or any other motion) character, a display method called the "sliding ghost" metaphor is proposed. Sliding ghosts refers to consecutive freeze frames of the motion data representing key postures of the motion. Also, for enhanced viewing of the motion data, the player can set the view point and key postures may be augmented, with short texts/audio display to further inform the player of the next/current dance (motion) segment to perform. The motion of the player is captured by tracking five specific positions of the player's body. The five body positions are tracked by having the player wear reflective markers on the respective positions, by using four analog/digital cameras with infrared light diodes/filter, a digital signal processing (DSP) board and a personal computer. The computational cost is made lower by taking advantage of the history based prediction and reference motion data. As the motion capture of the player occurs, an instant evaluation is performed by a simple comparison at each discrete time instant and later totaled and averaged for an overall score.

20 Claims, 8 Drawing Sheets

METHODS AND APPARATUS OF DISPLAYING AND EVALUATING MOTION DATA IN A MOTION GAME APPARATUS

BACKGROUND OF THE INVENTION

1. Field of the Invention

The present invention relates to methods and apparatus of displaying and evaluating motion data in a motion game apparatus, and more particularly to methods and apparatus of playing the motion data so that a game player can easily follow the motion of an original actor using computer graphics, collecting the player's motion data in real time and evaluating the motion of the player.

2. Description of the Related Art

Recently, what is called, the DDR (Dance Dance Revolution) type of game apparatus has been gaining in worldwide popularity. DDR has a music playing device and a floor that senses discrete footsteps (e.g. place right foot on the north-west corner) of a game player. In DDR, the specific foot actions the game player must follow and their relative timings are shown on the screen as the music is played. The goal of the game is to produce as many correct footsteps at the right time as possible.

In the spirit of making the game based on more realistic dance motion (rather than simple discrete foot steps), a slightly updated version of this type of dance game has been introduced by a number of companies. They are mostly based on an attachment of sensor modules that detect discrete hand/arm actions (e.g. pass right hand through the right hand sensor) in addition to the foot action sensing floor.

However, these schemes still fall very short of inducing realistic and natural dance (or any other motion) and evaluating the player's continuous motion. This is because discrete foot/hand actions are far different from actual dances (or any other motion) custom-choreographed for particular music pieces.

SUMMARY OF THE INVENTION

It is therefore the objective of the present invention to overcome the aforementioned problem by presenting motion data (e.g. actual dance) so that the player can easily follow it, by capturing the player's motion and by comparing and evaluating it against the original motion data.

Furthermore, it is the other object of the present invention to provide a method of capturing and evaluating player's motion data in "real time" (as the dance is being performed) in order to provide effective feedback and thus training.

BRIEF DESCRIPTION OF THE DRAWINGS

Features and advantages of the present invention will become apparent to those skilled in the art from the following descriptions with reference to the drawings, in which.

DETAILED DESCRIPTION OF THE PREFERRED EMBODIMENTS

For simplicity and illustrative purposes, the principles of the present invention are described by referring mainly to the exemplary embodiments thereof. However, one of ordinary skill in the art would readily recognize that the same principles are equally applicable to many types of motion capturing methods and apparatuses.

To induce the correct motion out of the player, in addition to simply showing the animated dancing (or any other motion) character, a display method called the "sliding ghost" metaphor is introduced. Sliding ghosts refer to consecutive freeze frames of the motion data. The main animated dancing character is located in the middle of a display (by default facing toward the player looking into the screen), and at any given time instance (say at t=t1), a few frozen motion frames (drawn as a transparent ghostly figure) of $t1+k1*\Delta t, t1+k2*\Delta t, t1+k3*\Delta t, t1+k4*\Delta t, \ldots t1+kn*\Delta t$ are shown beside the main character in the middle. Here, each kn a numerical factor such that $kn*\Delta t$ represents a time in the future. Each ghost represents a result of a body movement (or position) at some point in the future of the main animated character. The ghosts are drawn at a fixed distance from the main character proportional to how advanced in time of frame they represent. In other words, the physical distance of each ghost from the main animated character is substantially in proportion to the temporal distance of each ghost's future time frame from the current time frame. Therefore, as time progresses, each frozen ghostly frame is seen approaching toward, and finally merging into, the main frame.

The number of frozen frames displayed (the value of n), values of $k_i$'s and the amount of basic time increment $\Delta t$ is user settable (e.g. n=3 and $\Delta t$=0.5 second). Usually, $k_i$'s are set (by the developer) so that the frozen frames represent important "key postures" during a particular motion. These frozen motion frames of slight future are used as cues to remind players the next imminent dance/stance/motion to perform.

Also, for enhanced viewing of the motion data, the player can set the view points. For example, the view can be from the front (and follow the motion as of viewing the mirror), from the back, from the sides (left or right), and so on. Key postures may be augmented with short texts/audio display (located in the lower part of the screen underneath the main character) to further inform the player of the next/current dance (motion) segment to perform (e.g. "hands up!", "disco time", etc.)

The motion of the player is captured by tracking specific positions of the player's body (its mechanism to be explained later). These may be the two wrists, two ankles and the belly. To give feedback and inform the player of how well one is following the motion, whenever the player's tracked positions fall within a threshold value of where it should be, the corresponding positions on the animated figure gets highlighted with special effects (e.g. exploding lights) and is given commendation (e.g. "perfect", "excellent", "good", etc.)

The body positions are tracked by having the player wear markers on the respective positions, by using sensors such as analog/digital cameras with infrared light diodes/filter, a digital signal processing (DSP) board and a computer. The three dimensional positions of the markers are computed by analyzing the images captured by the cameras. As the motion capture data of the original motion contains three dimensional position data of the corresponding body positions (e.g. wrists, ankles, belly), the evaluation is performed by a simple comparison at each discrete time instant and later summed and averaged (e.g. at t=t1, original data might say the wrist must be at x=100, y=200, z=50, and the data captured by the cameras might determine that the player's right wrist is at x=102, y=160, z=45, thus the difference is $\Delta x=2$, $\Delta y=60$, $\Delta z=5$). The comparison is performed at multiple levels, e.g. one over the whole motion data and the other at the key postures only. Relative weights of score contribution may be adjusted. Difficulty level may be controlled by adjusting the threshold values (e.g. perfect means within distance 5 from the original motion data, thus to make it easier, set the threshold to 10).

As the motion data is captured by a performer with a nominal body size, its data can not directly be compared to a player whose body size may be different. The player is instructed to supply one's height, so that the original motion data can be scaled and be "retargeted" for the current player.

Figure 1:
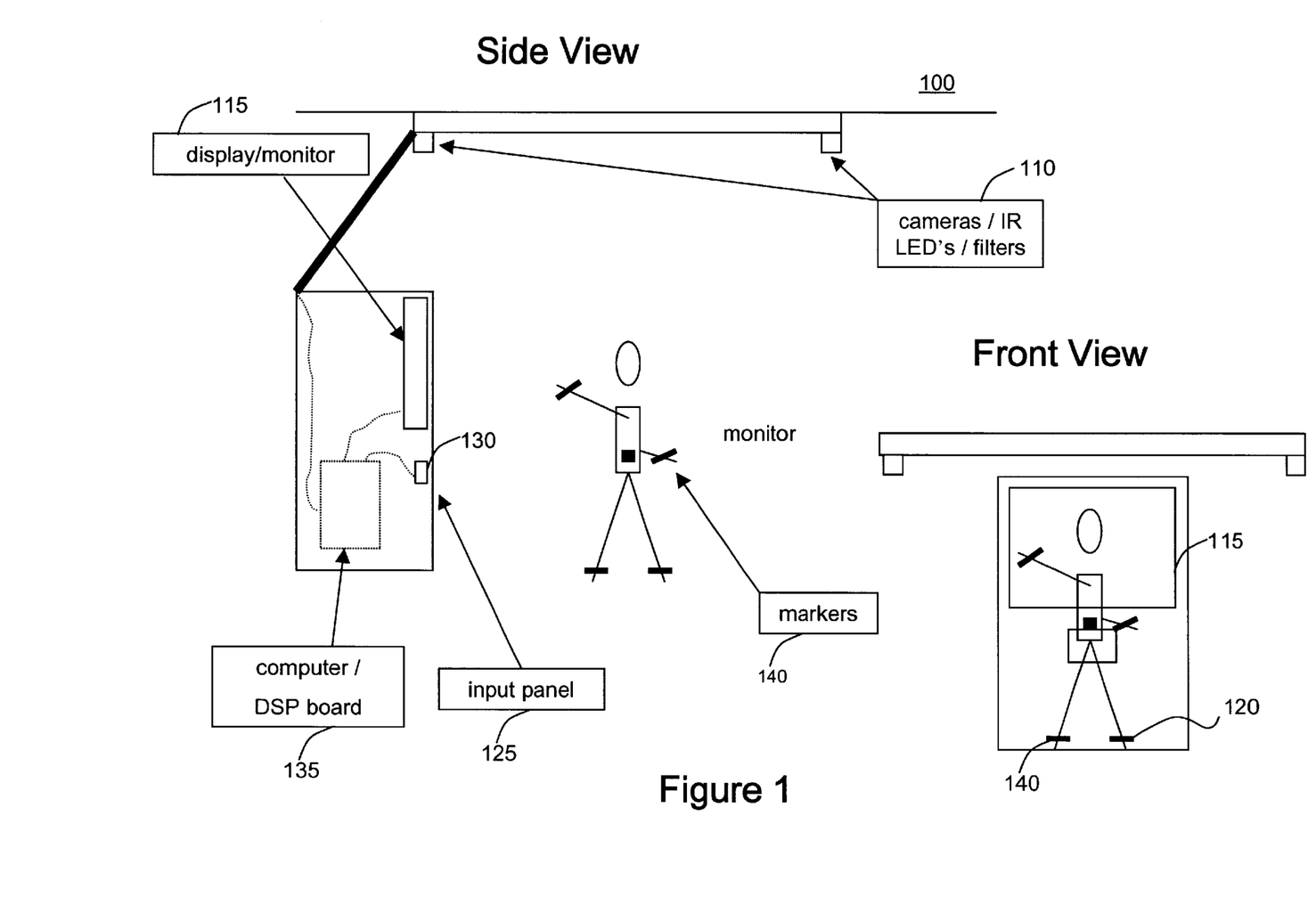
FIG. 1 is a configuration diagram of a motion game apparatus according to an aspect of the present invention.

FIG. 1 is a configuration diagram of a motion game apparatus according to an aspect of the present invention. The motion game apparatus 100 includes a plurality of analog/digital cameras 110 (equipped with a plurality of infrared light diodes and infrared, normal distribution and light polarizing filters), a display device 115 (e.g. monitor) displaying a motion of an original actor 120, an input section 125 (e.g. buttons) receiving input from a game player, and a sound device 130. The player's input and camera images are processed by a computer and/or digital signal processing board 135 to generate a computer graphics display, play music files, capture the player's motion and evaluate the player's motion. The game player attaches a plurality of optical markers 140 to his body and performs motion segments within a region visible by the cameras. The camera monitors the motion of the game player by tracking the reflective markers 140 attached to the body of the game player.

It should be noted that other combinations of markers and sensors fall within the scope of the invention.

Preferably, the reflective markers 140 are attached to all articulation points of the game player, if possible. These are points of the body that can move relatively independently of other points—knees, elbows, etc. More preferably, the number of the optical sensors is appropriately selected in view of the processing rate and cost because the number of image processing operations increase as the number of the positions (or markers) to track increases. Furthermore, while it is possible to obtain more precise motion data as the number of the cameras increase, the number of the cameras 100 are selected also in view of the same problem with the number of the markers 140 as stated above.

Figure 2:
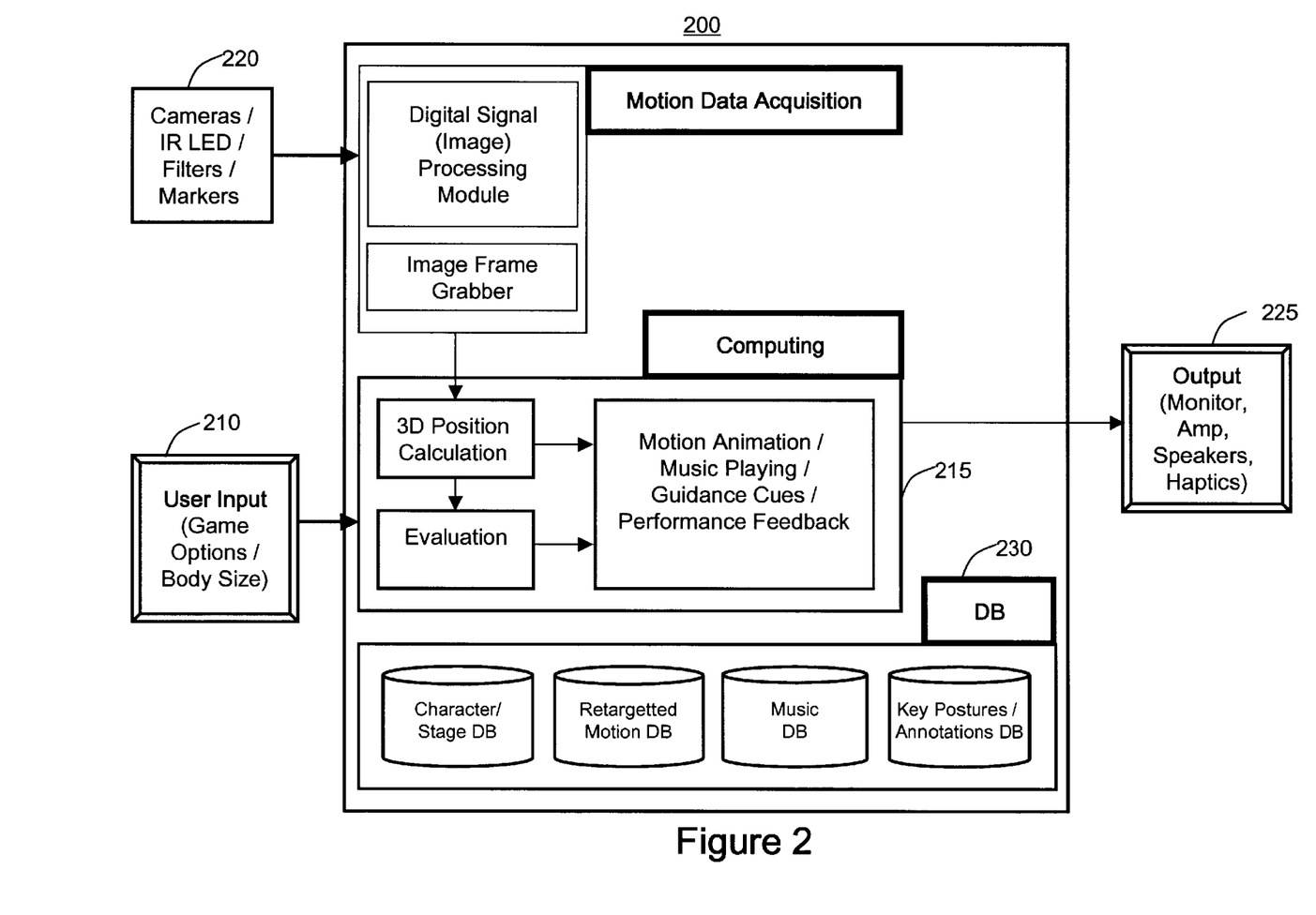
FIG. 2 is a block diagram of a motion game apparatus according to an aspect of the present invention.

FIG. 2 is a block diagram 200 of a motion game apparatus according to an aspect of the present invention. The motion game apparatus of the present invention includes an input/selection unit 210, computing unit 215 (e.g. a personal computer, graphics board), motion data acquisition unit 220 (e.g. cameras/markers and/or digital signal processing board), information display unit 225 (graphics, sound, etc.), and a data base unit 230 (e.g. motion, music, character, stage, graphic data).

The input/selection unit 210 accepts input from the user to allow selection of a particular motion to follow and music to play, a dancing character, its stage and viewpoint, and supply player's height information. Other mode selections may be possible (e.g. whether to display the ghosts and other motion guide cues). A supervisor may change various settings such as the difficulty level, relative evaluation weights, and so on.

The computing unit 215 accepts multiples of two dimensional marker data from different viewpoints and extracts the three dimensional positions of the markers of the player. If the digital signal processing board is not used (in the future, a general computer may be fast enough not to require a DSP board), the computing unit would directly accept the raw image data from the cameras to initially extract the two dimensional marker data. For evaluation, these data are compared to that of the corresponding original motion already retargeted for the given player's height and stored in the motion database. The computing unit "plays" the content by generating the motion animation, motion guiding cues, such as the ghosts and annotations, feedback information, and musical sound. Some aspects of the graphic/sound output may be selected by the user through the input unit 210 (e.g. stage, character, music/dance piece, view point, etc.).

The motion data acquisition unit 220 includes a number of reflective markers, analog/digital cameras, and/or digital signal processing board. The cameras are equipped with infrared light emitting diodes and IR, normal distribution and light polarizing filters to isolate marker images from the rest of the background. The infrared lights reflected by the markers pass through the filter, while other light fails to do so. Consequently, given that there are no other direct light sources seen by the cameras, only the markers will appear as white blobs on the resulting images. Such images are captured approximately at 20–30 times per second. At each captured instant, the 2D locations of the markers on each of the camera images are computed by computing the center of area of the white blobs. The problem of determining which blob corresponds to which marker is solved by a simple prediction based on the original motion data. Using the original motion data, since one can predict where the white blob of a given marker is likely to be located assuming the player tries to follow the original motion as close as possible. Therefore, one can open a "prediction" window for each marker, and any white blob that falls within its corresponding prediction window will be recognized as that particular marker.

The information display unit 225 includes an image output display (e.g. monitor), sound generation module (e.g. amplifier, speakers, etc.), and haptic device (e.g. motion simulator, haptic joystick, etc.). The data base module 230 stores motion data (dance data) retargeted for a number of different heights, different characters and stage data for user selection, music files, key posture and annotation data, weights and constants for the evaluation function, etc.

Figure 5:
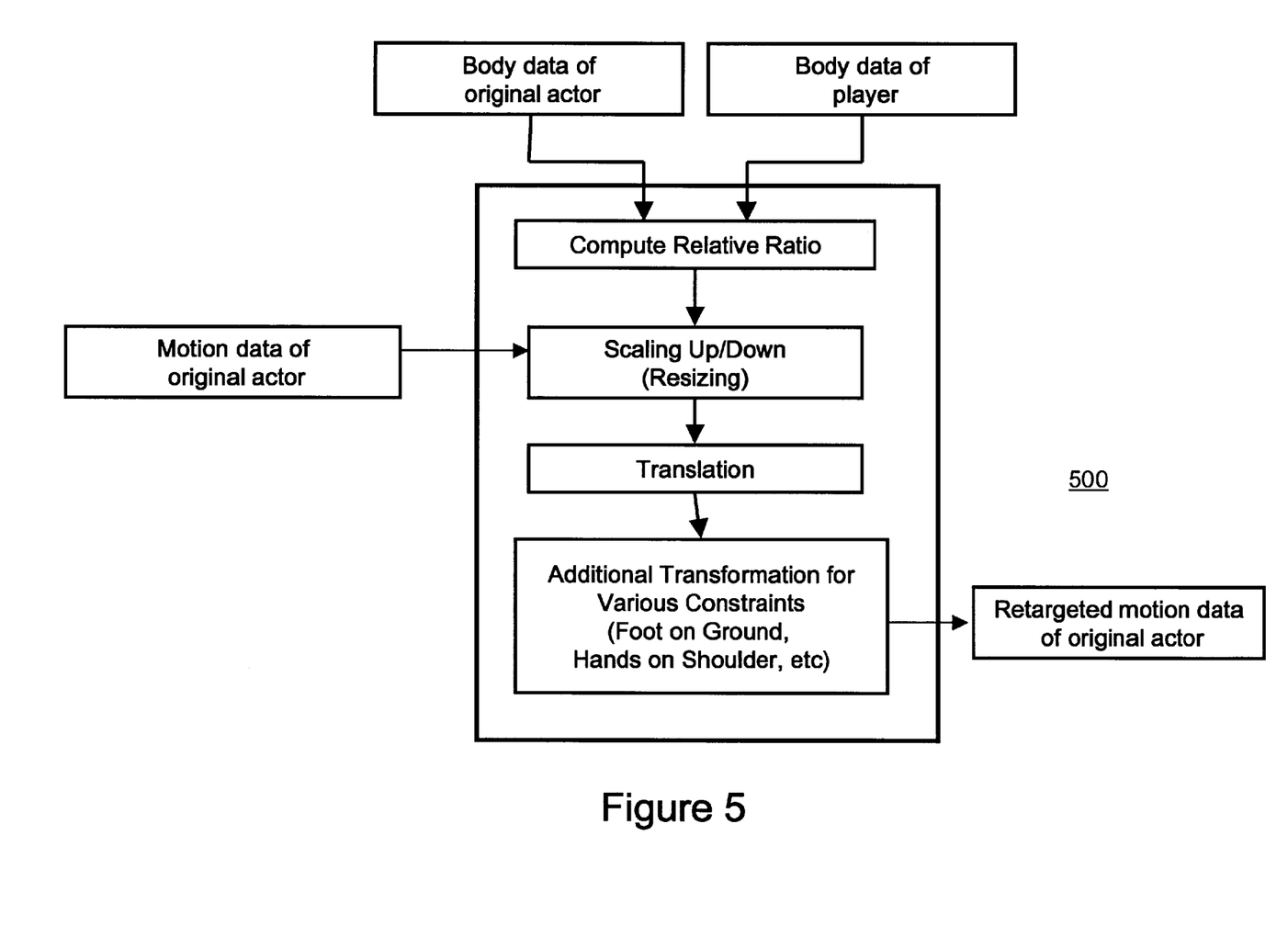
FIG. 5 is a flow chart showing the retargeting process for the correct evaluation purpose according to an aspect of the present invention.

The original motion data is captured from a performer with a nominal body size and its data can not directly be compared to a player whose body size may be different. The player is instructed to supply one's height, so that the original motion data can be scaled and be "retargeted" for the current player. That is to say, the retargeting is a process to normalize the body size difference of the current player and the person who performed for the original motion capture. An example of the motion retargeting process 500 is shown in FIG. 5. Once the height, or other relevant body factors, of the game player is received by input from a user (alternatively, image processing techniques can be used to automatically approximate the height of the player), the approximate body ratio between the original motion capturer and the player is computed and the motion data is scaled uniformly about the center of the body according to the ratio. A translation of the whole body data may be needed to satisfy the constraint that the character's feet should be attached to the ground. For instance, after a scale down operation, the transformed character may appear floating in the air, thus there would be a need to translate its center downward until its feet touches the ground.

Figure 3:
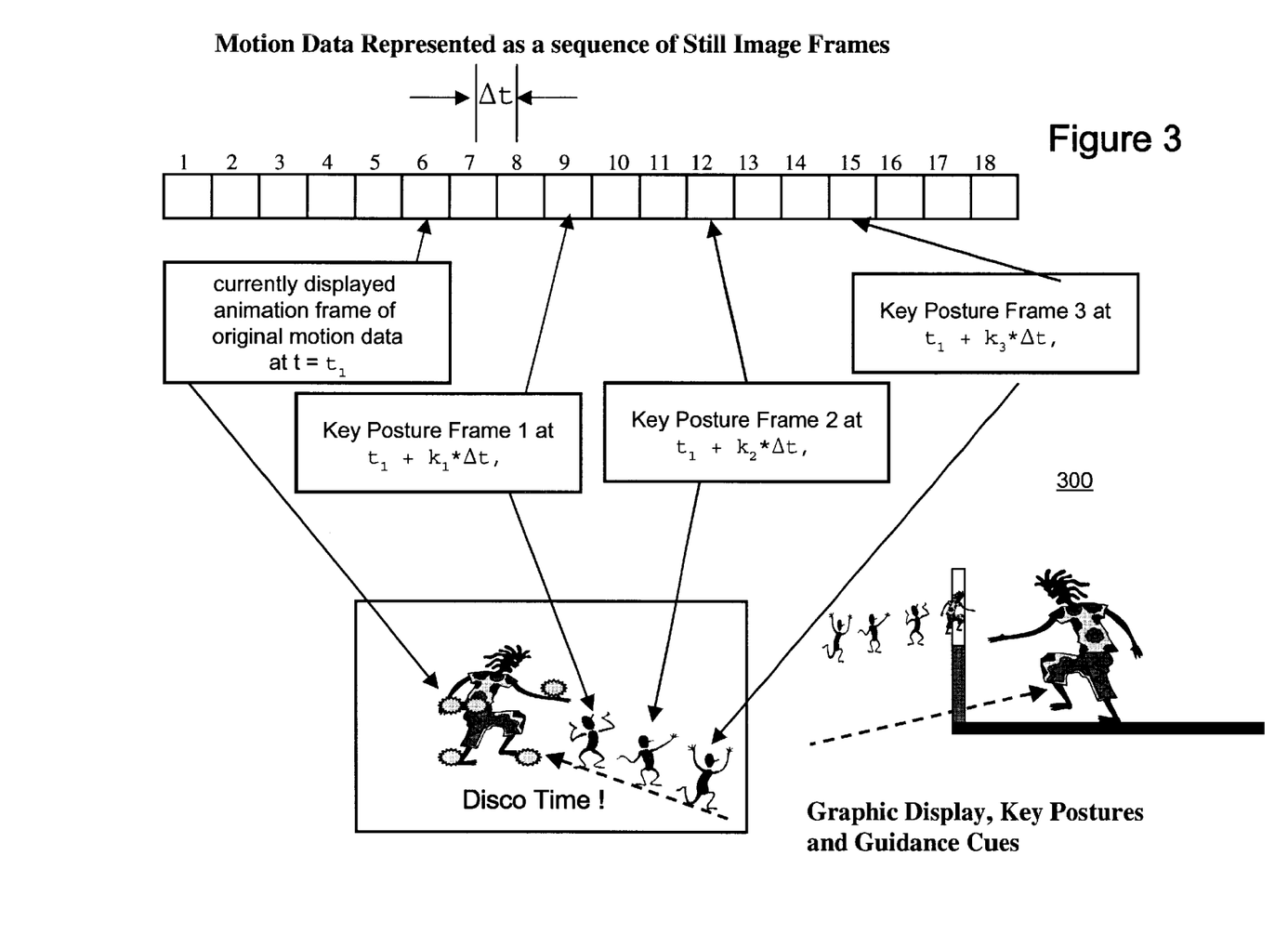
FIG. 3 shows the general frame structure of the motion data and the concept of the ghost metaphors according to an aspect of the present invention.

FIG. 3 shows an example general frame structure 300 of the motion data and the concept of the ghost metaphors according to an aspect of the present invention. A motion data, in fact, is a sequence of stances sampled at about 20–30 times per second. Each "frame" in the sequence holds data for a three-dimensional position and their orientation for a number of body parts (usually at the articulation points of the body). By associating these data to an appropriately sized skeleton, animation can be reconstructed by drawing the skeleton at the rate equal to the original sampling rate. For animation purposes, motion frames are generally stored in a special format, for instance, called BVH.

Therefore, at any given instant of the animation, a certain frame will be displayed on the screen and the "ghosts" refer to frames of slight future (as indicated in the figure). In other words, for any given time instance (say at t=t1), a few frozen future motion frames (drawn as a transparent ghostly figure) of $t1+k1*\Delta t, t1+k2*\Delta t, t1+k3*\Delta t, t+k4*\Delta t, \ldots t1+kn*\Delta t$ are shown beside the main character as well. The ghosts are drawn at a fixed distance from the main character proportional to how advanced in time of frame it represents. Therefore, as the time progresses, each frozen ghostly frame is seen as approaching toward, and finally merging into, the main frame.

The number of frozen frames displayed (the value of n), values of $k_i$'s and the amount of basic time increment $\Delta t$ is user settable (usually n=3 and $\Delta t$=0.5 second). Usually, $k_i$'s are set (by the developer) so that the frozen frames represent important "key postures" during a particular motion. These frozen motion frames of slight future are used as cues to remind players the next dance/stance/motion to perform/take.

Figure 4:
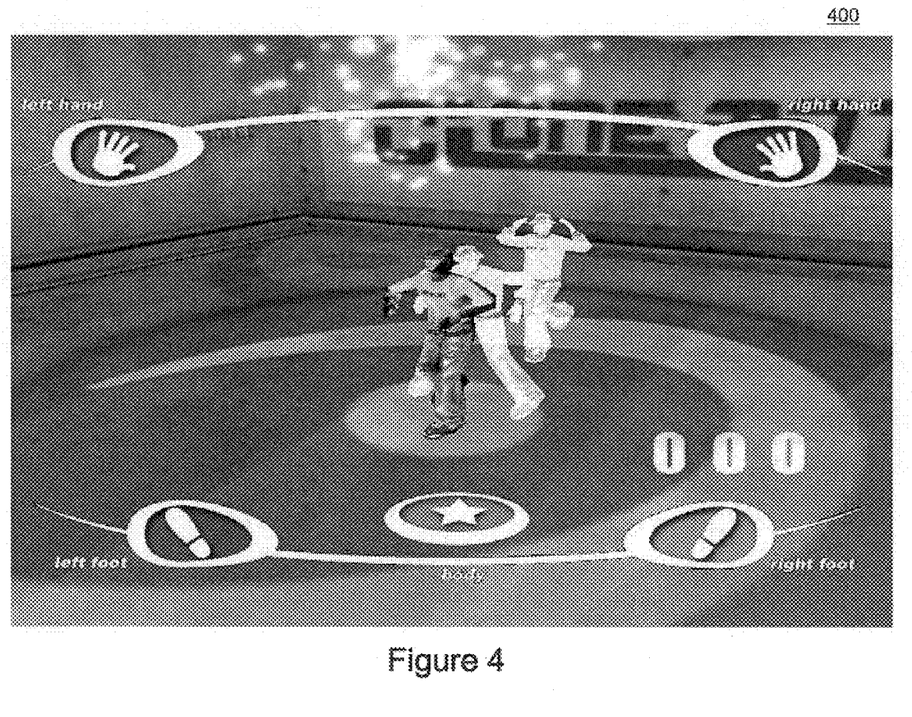
FIG. 4 is a description drawing for describing a method of displaying the dance (or motion) data for easier inducement of the correct motion from the player according to an aspect of the present invention.

Also, for enhanced viewing of the motion data, the player can set the view point from the front (and follow the motion as if viewing a mirror), from the back, from the sides (left or right), and so on. Key postures may be augmented with short texts/audio display (located in the lower part of the screen underneath the main character) to further inform the player of the next/current dance (motion) segment to perform (e.g. "hands up!", "disco time", etc.). The key postures and annotated texts/sounds are designated using a separate management tool preferably by the motion expert (e.g. dancer) and saved in a separate file. The motion of the player is captured by tracking specific articulation positions on the player's body (its mechanism to be explained later). These may include the two wrists, two ankles, and the belly. To give feedback and inform the player of how well one is following the motion on the screen, whenever the player's tracked positions fall within a threshold value of where it should be, the corresponding positions on the animated figure may be highlighted with special effects (e.g. exploding lights) and is given commendation (e.g. "perfect", "excellent", "good", etc.). FIG. 4 is an exemplary display 400 for describing a method of displaying the dance (or motion) according to an aspect of the present invention.

Figure 6:
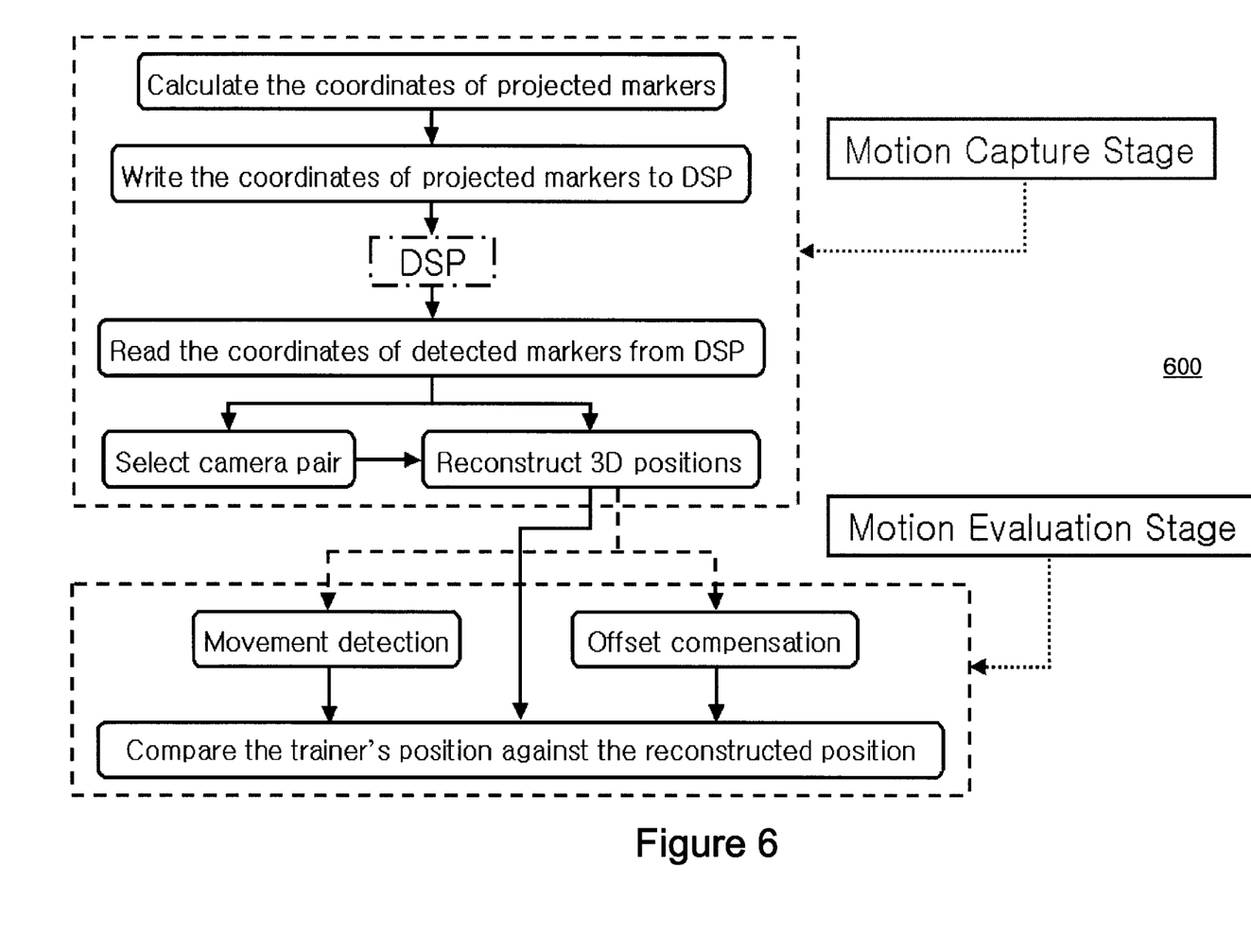
FIG. 6 is a detailed block diagram of the motion capture module according to an aspect of the present invention.

FIG. 6 is a detailed block diagram 600 of the motion capture module according to an aspect of the present invention. The body positions are tracked by having the player wear reflective markers on the respective positions, and by using cameras with infrared light diodes/filter, a digital signal processing (DSP) board and a computer.

The infrared lights reflected by the markers pass through the filter, while other light fails to do so. Consequently, only the markers will appear as white blobs on the resulting images. Such images are captured at approximately 20–30 times per second. At each captured instant, the 2D location of the markers on each of the camera images are computed by computing the center of area of the white blobs. The problem of determining which blob corresponds to which marker is solved by a simple prediction based on the original motion data. Using the original motion data, since one can predict where the white blob of a given marker is likely to be located, assuming the player tries to follow the original motion as closely as possible. Therefore, one can open a "prediction" window for each marker, and any white blob that falls within its corresponding prediction window will be recognized as that particular marker. The data for the prediction windows may come from the motion data base, and the size of the window can be adjusted. In general, the larger the window size, the longer the processing time can get, but more chances to "miss" the marker if the player is not following the motion very well. For ideal data acquisition, it is preferred that there are no other direct incoming light sources. Other reflective natural or artificial light can be filtered by using a normal distribution and polarizing filter, or by installing a short fence around the apparatus to block other potential visible direct light sources.

The three dimensional positions of the markers are computed by the computer upon receiving the 2D marker locations, through triangulation. In general, since it is enough to use two sets of 2D coordinates from two different view points to reconstruct 3D positions, when there are more than two cameras, only two sets of camera data need be selected according to a heuristic. For instance, one may select camera data from ones that have markers within the prediction window (not missing due to occlusion), and among them, the selection may be made by proximity (e.g. for left wrist, we choose left two cameras).

The motion capture mechanism, when based on a prediction algorithm, can suffer from two main problems. One is the missing marker problem and the other is the switched marker problem. The missing marker problem can arise due to markers being occluded (and not seen by the camera) by body parts (e.g. right arm hiding the left wrist), or due to players not following the prescribed motion (thus markers not falling within the prediction window). In order to alleviate this problem, the tracking system is initialized at start time, then, once markers are detected, they are tracked using "prediction" by their moving direction, velocity, and acceleration. That is, the prediction window is opened by computing where the markers will land after a small time instant by considering their moving direction, velocity, and acceleration. Sometimes this technique may not work if the player suddenly moves in a different direction because the prediction window may miss the marker. When a marker is missed for a set number of frames, the prediction window is reset at a position predicted by the original motion as described in the previous paragraph. In general, missing markers will, therefore, indirectly indicate badly followed motion and result in a low score by virtue of low capture rate.

The second problem occurs by two markers coming into a close region and falling within an overlapped prediction window, thus may fail to get distinguished. This problem is partially alleviated by monitoring the marker positions and if the marker positions deviate beyond a preset threshold from the expected positions (predicted by the original motion), it is again reset using the prediction algorithm described in the previous paragraphs. This way, even though two or more markers become recognized as switched, after few frames, they will be reset, assuming that the player tries to follow the original motion.

Figure 7:
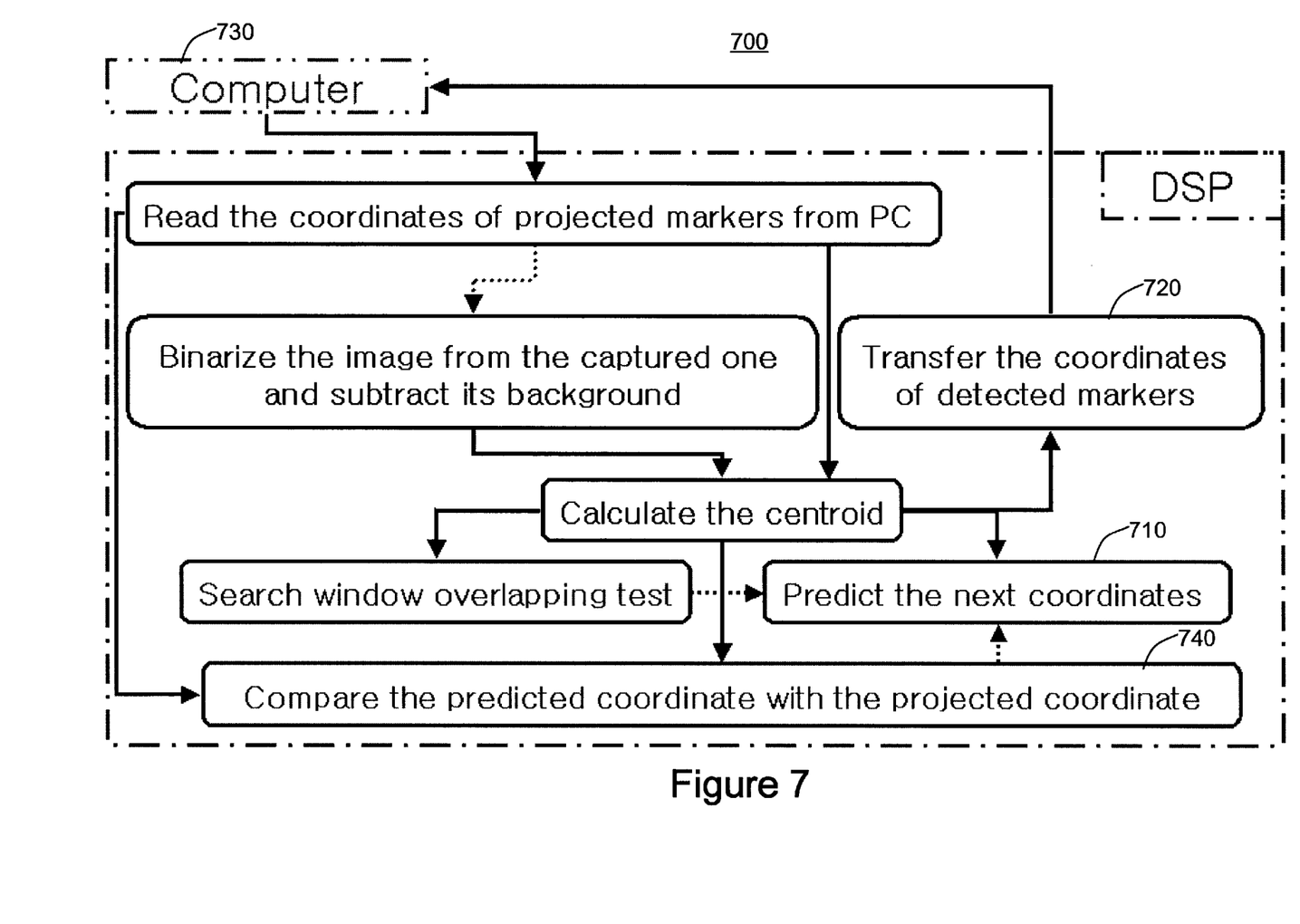
FIG. 7 is a detailed flow chart describing the method of evaluating the player's motion according to an aspect of the present invention.

FIG. 7 is a detailed flow chart 700 describing the method of evaluating the player's motion and the motion capture process according to an aspect of the present invention. The motion capture data of the original motion contains three dimensional position data of the corresponding body positions (e.g. wrists, ankles, belly), and the evaluation is performed by simply comparing how different they are at a given time instant (e.g. at t=t1, original data might say the wrist must be at x=100, y=200, z=50, and the data captured by the 4 cameras might say player's right wrist is at x=102, y=160, z=45). The comparison may be done at two levels, one over the whole motion data, and the other at the key postures only. Relative weights of score contribution can be adjusted. Difficulty level can be controlled by adjusting the threshold values (e.g. "perfect" is determined to be within distance 5 from the original motion data). An example of a more detailed explanation of the real time evaluation scheme is given below. At any given instant or for any given frame:

1. Either from the original motion data, or from the previous marker information (velocity/acceleration/direction), compute the next predicted marker location (step 710).
2. Project the predicted marker position into 2D camera space. Send these data to the DSP board (step 720).
3. DSP board opens a prediction search window and the prescribed location with a preset window size (determined by trial and error). Compute the 2D location of the markers and send these data back to the computer (step 720).
4. Computer selects two appropriate data set and triangulates them to obtain 3D positions of the markers of the player (step 730).
5. If the player's markers are within a certain distance range, assign a score (e.g. within 5 units, score 5, within 4 units, score 4, and so on) (step 740). Perfectly followed motion will produce a score of 25. Multiply the score by a relative weight (e.g. if this is a key posture it may be weighted more than a non key posture frame). At each instant, if the score is above certain range, assign commendation (e.g. >24,—perfect, >19 excellent, >14 good, etc.). Score/frame=relative weight*sum (miniscore for each marker).

After the motion is finished, total all the scores and divide by the perfect score.

Final score=sum(score/frame)/perfect score

The score may be adjusted to deal with some problems such as "offset" and "delay". In order to overcome the "offset" problem, where the player has managed to follow the motion qualitatively, but off of the center position (thus resulting in a low score), a simple compensation can be made by monitoring the player's offset from the enter position. For example, the offset may be computed by estimating the center position of the player as being at the midpoint of one's two ankles (tracked by the cameras). Tracking the belly marker for this purpose may be an unreliable method because it often gets confused with the passing wrist markers.

The "delay" problem, in which the player is slightly late in following the motion, can be overcome by applying "time shifts", by fitting the player's motion data to that of the original motion data at nearby critical points.

Figure 8:
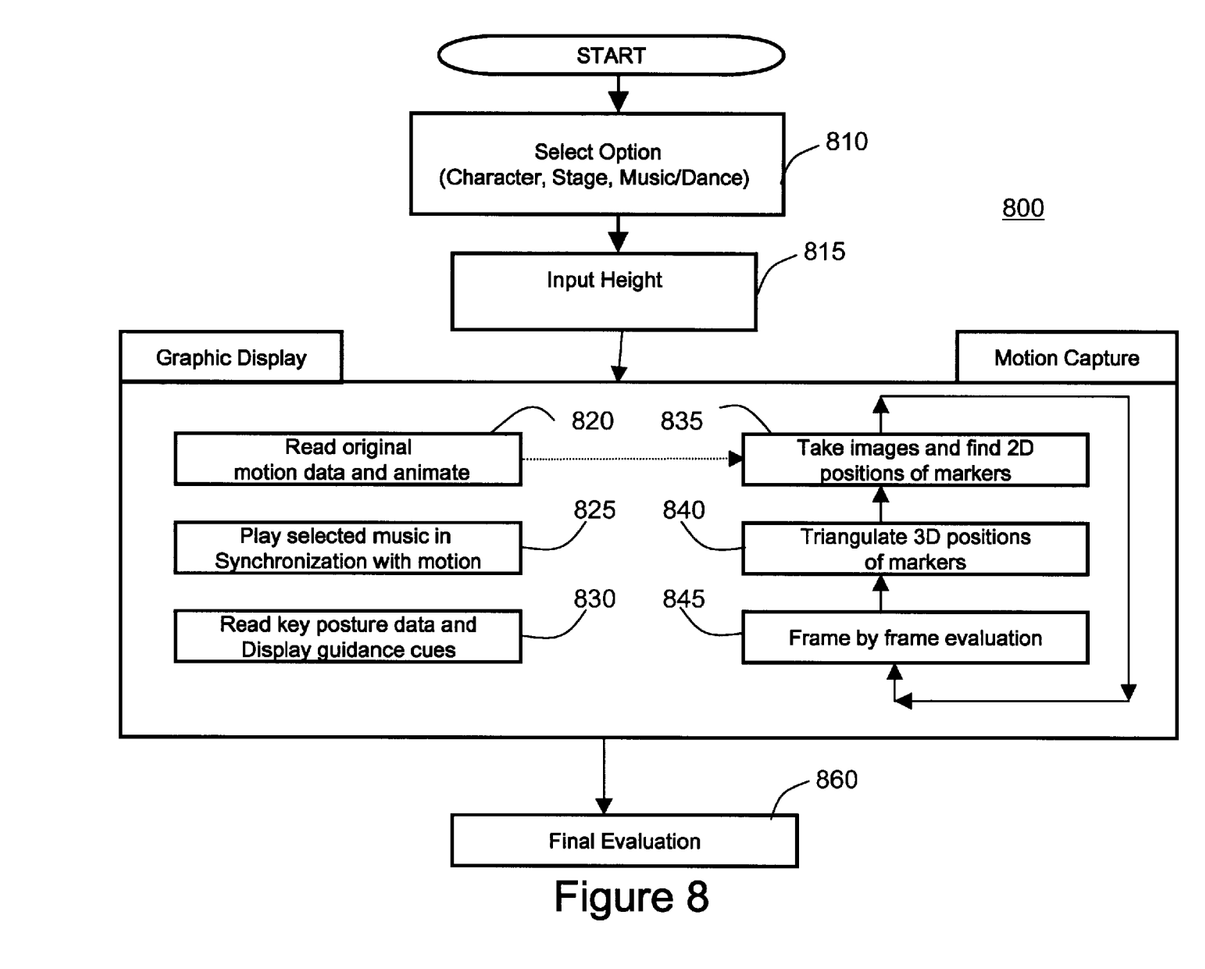
FIG. 8 is the overall flow chart showing the performance sequence according to an aspect of the present invention.

FIG. 8 is a flow chart 800 showing a performance sequence according to an aspect of the present invention. The dance game or the motion evaluation system is started by the user supplying one's height (step 815) and setting a few options such as the particular motion/dance to follow, the character and stage, a comfortable view point, whether to display annotations and ghosts, and so on (step 810). The player is instructed to wear the reflective markers on one's wrists, ankles and belly. Once all the options and the marker preparation is complete, the music starts to play and the chosen character starts to dance on the screen (steps 820, 825, and 830). Along with the dancing character, the ghosts at key posture timing may appear along side. The player is to try one's best to imitate the character's motion. As the player performs, whenever the player's markers fall within a fixed distance from where it should be (according to the reference motion), corresponding body parts splash with special effects and appropriate commendations appear on the screen. This way, the players receive feedback on how well one is following the motion (steps 835, 840, and 845). During this time, the cameras, DSP Board/computer are in action to track the player's markers and evaluate the motion. After the music and the dance piece is over, the overall score is totaled and averaged for a final letter grade (e.g. >90—A, >80—B, and so on) (step 860).

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only, and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of displaying motion guidance cues, comprising:

receiving inputs related to a user;

displaying a main animated character whose motion the user is to emulate; and displaying one or more ghosts of the main animated character, wherein each ghost represents a body position of the main animated character at a future time frame.

2. The method of claim 1, wherein each of the one or more ghosts is displayed at a physical distance away from the animated main character such that the physical distance is substantially in proportion to a temporal distance of the future time frame of the ghost from a current time frame.

3. The method of claim 1, further comprising:

capturing motion of the user;

comparing the motion of the user to the motion of the main animated character; and providing feedback to the user based on the comparison.

4. The method of claim 3, wherein:

the step of capturing includes tracking one or more specific body points of the user; and the step of comparing includes comparing the one or more specific body points of the user with corresponding one or more specific body points of the main animated character.

5. The method of claim 4, wherein the step of capturing further includes:
  determining a two-dimensional position of each of the one or more specific body points of the user from two or more perspectives; and
  calculating a three-dimensional position of each of the one or more specific body points of the user based on the two-dimensional position information of the user gathered from the two or more perspectives.

6. The method of claim 5, wherein the specific body points of the user include articulation points of the user.

7. The method of claim 6, wherein the two-dimensional position of each articulation point of the user is determined by sensing a two-dimensional position of a corresponding marker attached to each articulation point of the user.

8. The method of claim 7, further including predicting marker positions to compensate for at least one of:
  a missing marker problem wherein a marker is occluded from detection from a particular perspective; and
  a switched marker problem wherein positions of the two or more markers fail to be distinguished from sensing.

9. The method of claim 3, wherein the step of comparing includes at least one of:
  scaling and retargeting motion data of the main animated character to the user;
  compensating for an offset problem wherein the user has substantially followed the retargeted motion of the main animated character but wherein a physical position of the user is at an offset from a physical position specified by the main animated character; and
  compensating for a delay problem wherein the user has substantially followed the retargeted motion of the main animated character but wherein the motion of the user is delayed from a timing specified by the main animated character.

10. The method of claim 9, wherein scaling and retargeting the motion data is based on a height of the user.

11. A system to display motion guidance cues, comprising:
  an input unit configured to receive inputs related to a user; and
  a display unit configured to:
    display a main animated character whose motion the user is to emulate;
    display one or more ghosts of the main animated character, wherein each ghost represents a body position of the main animated character at a future time frame; and
    provide feedback information to the user.

12. The system of claim 11, wherein each of the one or more ghosts is displayed at a physical distance away from the animated main character such that the physical distance is substantially in proportion to a temporal distance of the future time frame of the ghost from a current time frame.

13. The system of claim 11, further comprising:
  a motion data acquisition unit configure to capture the motion of the user; and
  a computing unit configured to compare the motion of the user to the motion of the main animated character.

14. The system of claim 13, wherein:
  the motion data acquisition unit is further configured to track positions of one or more specific body points of the user; and
  the computing unit is further configured to compare the one or more specific body points of the user with corresponding one or more specific body points of the main animated character.

15. The system of claim 14, wherein:
  the motion data acquisition unit is further configured to determine a two-dimensional position of each of the one or more specific body points of the user from two or more perspectives; and
  the computing unit is further configured to calculate a three-dimensional position of each of the one or more specific body points of the user based on the two-dimensional position information of the user gathered from the two or more perspectives.

16. The system of claim 15, wherein the specific body points of the user include articulation points of the user and wherein the motion data acquisition unit is further configured to determine the two-dimensional position of each articulation point by sensing a two-dimensional position of a corresponding marker attached to each articulation point of the user.

17. The system of claim 16, wherein the motion data acquisition unit is further configured to predict the marker position to compensate for at least one of:
  a missing marker problem wherein a marker is occluded from detection from a particular perspective; and
  a switched marker problem wherein positions of two or more markers fail to be distinguished.

18. The system of claim 13, wherein the computing unit is further configured to perform at least one of:
  scaling and retargeting motion data of the main animated character to the user;
  compensating for an offset problem wherein the user has substantially followed the retargeted motion of the main animated character, but wherein a physical position of the user is at an offset from a physical position specified by the main animated character; and
  compensating for a delay problem wherein the user has substantially followed the retargeted motion of the main animated character, but wherein the motion of the user is delayed from a timing specified by the main animated character.

19. The system of claim 18, wherein scaling and retargeting the motion data is based on a height of the user.

20. A method to display motion guidance cues, comprising:
  receiving inputs related to a user;
  displaying a main animated character whose motion the user is to emulate;
  displaying one or more ghosts of the main animated character, wherein each ghost represents a body position of the main animated character at a future time frame;
  scaling and retargeting motion data of the main animated character to the user;
  capturing the motion of the user;
  comparing the motion of the user to the retargeted motion of the main animated character;
  compensating for an offset problem wherein the user has substantially followed the retargeted motion of the main animated character, but wherein a physical position of the user is at an offset from a physical position specified by the main animated character;
  compensating for a delay problem wherein the user has substantially followed the retargeted motion of the main animated character, but wherein the motion of the user is delayed from a timing specified by the main animated character; and
  providing feedback to the user.

* * * * *